United States Patent
Josephson

(10) Patent No.: US 11,632,973 B2
(45) Date of Patent: Apr. 25, 2023

(54) COMPOSITION COMPRISING TASTE MODULATION COMPOUNDS, THEIR USE AND FOODSTUFF COMPRISING THEM

(71) Applicant: V. MANE FILS, Le Bar sur Loup (FR)

(72) Inventor: Dave Josephson, Lebanon, OH (US)

(73) Assignee: V. MANE FILS, Le Bar sur Loup (FR)

(*) Notice: Subject to any disclaimer, the term of this patent is extended or adjusted under 35 U.S.C. 154(b) by 703 days.

(21) Appl. No.: 15/749,966

(22) PCT Filed: Aug. 5, 2016

(86) PCT No.: PCT/IB2016/001309
§ 371 (c)(1),
(2) Date: Feb. 2, 2018

(87) PCT Pub. No.: WO2017/025811
PCT Pub. Date: Feb. 16, 2017

(65) Prior Publication Data
US 2021/0015133 A1    Jan. 21, 2021

Related U.S. Application Data

(60) Provisional application No. 62/202,529, filed on Aug. 7, 2015.

(51) Int. Cl.
*A23L 27/20* (2016.01)
*A23L 27/00* (2016.01)

(52) U.S. Cl.
CPC ......... *A23L 27/2054* (2016.08); *A23L 27/86* (2016.08); *A23L 27/88* (2016.08)

(58) Field of Classification Search
CPC ....... A23L 27/2054; A23L 27/88; A23L 27/86
USPC ......................................................... 426/527
See application file for complete search history.

(56) References Cited

U.S. PATENT DOCUMENTS

| | | | |
|---|---|---|---|
| 4,096,158 A | 6/1978 | Evers et al. | |
| 4,917,913 A | 4/1990 | Buckholz, Jr. et al. | |
| 5,683,737 A | 11/1997 | Erickson et al. | |
| 6,391,364 B1 | 5/2002 | Lindsay | |

(Continued)

FOREIGN PATENT DOCUMENTS

| | | |
|---|---|---|
| CA | 821490 | 8/1969 |
| JP | 3068609 | 7/2000 |

(Continued)

OTHER PUBLICATIONS

Izumi Yajima et al: "Volatile Flavor Components of Cooked Kaorimai (Scented Rice, *O. sativa* japonica )", Agricultural and Biological Chemistry, vol. 43, No. 12, Dec. 9, 1979 (Dec. 9, 1979). (Year: 1979).*

(Continued)

*Primary Examiner* — Brent T O'Hern
(74) *Attorney, Agent, or Firm* — B. Aaron Schulman, Esq.; Stites & Harbison, PLLC

(57) ABSTRACT

Flavour modifying composition comprising one or more flavour modifying compounds of Formula I, product comprising said flavour modifying composition, use of said flavour modifying composition for modifying taste perception in foodstuffs and beverages and method of improving taste perception in a foodstuff or beverage comprising adding said flavour modifying composition to said foodstuff or beverage.

10 Claims, 1 Drawing Sheet

| Molecule | Benchtop Validation of Taste Modulation (applications tested) | | | | | | | | | | |
|---|---|---|---|---|---|---|---|---|---|---|---|
| | Salt | | | | Sweet | | | | | Bitterness | Umami |
| | Salt Solution (0.2-1.0%) | Maggi (10%-100%) | Kikkomen Soy Sauce (10%-100%) | Cheese sauce (100%) | Sucrose Soluton (2-8%) | Sucrolose Solution (150-300 ppm) | Reb-A Solution (150-300 ppm) | Coke Life (100%) | Sprite ZERO (100%) | Dark Chocolate | Maggi (10%-100%) |
| 2-piperidone (delta valerolactam) | Y | Y | Y | Y | Y | Y | Y | Y | Y | Y | Y |
| 2-pyrrolidone (delta butyrolactam) | Y | Y | Y | Y | Y | Y | Y | Y | Y | Y | Y |
| 4-hydroxy-2-pyrrolidinone | Y | Y | Y | Y | Y | Y | Y | dnt | dnt | dnt | Y |
| N-methylcaprolactam | Y | Y | Y | dnt | Y | Y | Y | dnt | dnt | dnt | Y |
| epsilon-caprolactam | Y | Y | Y | dnt | Y | Y | Y | Y | dnt | Y | Y |
| 5-methoxy-2-pyrrolidinone | dnt | Y | Y | dnt | Y | Y | Y | dnt | dnt | dnt | Y | dnt = did not test

(56) References Cited

U.S. PATENT DOCUMENTS

| | | | | |
|---|---|---|---|---|
| 6,627,234 | B1* | 9/2003 | Johnson | A23G 4/06 424/440 |
| 2010/0233102 | A1 | 9/2010 | Krammer et al. | |
| 2013/0115356 | A1 | 5/2013 | Gelin et al. | |
| 2014/0147395 | A1* | 5/2014 | Rieth | A61K 8/498 424/49 |

FOREIGN PATENT DOCUMENTS

| | | | |
|---|---|---|---|
| JP | 2012070636 | | 4/2012 |
| JP | 2013039083 | | 2/2013 |
| JP | 2013039083 | A * | 2/2013 |

OTHER PUBLICATIONS

Translation of JP-2013039083-A (Year: 2013).*
Epsilon Caprolactam, The Good Scents Company, (published Nov. 12, 2006). (Year: 2006).*
Izumi Yajima et al: "Volatile Flavor Components of Cooked Kaorimai (Scented Rice, *O. sativa* japonica )", Agricultural and Biological Chemistry, vol. 43, No. 12, Dec. 9, 1979 (Dec. 9, 1979), pp. 2425-2429, XP055332700, JP ISSN: 0002-1369, DOI: 10.1080/00021369.1979.10863850 p. 2429, left-handed column, paragraph 4—right-handed column, paragraph 3; table II p. 2425, left-handed column, paragraph 3.
Anthony K Q Kamassah et al: "The Physic-chemical Characteristics of Yeast Fermentation of two Mango (Mangifera indica Linn) Varieties", Food Science and Quality Management, 2013, pp. 45-56, XP055332697, Retrieved from the Internet: URL:http://s3.amazonaws.com/academia.edu.documents/32789075/The_Physico-chemicalCha racteristics.pdf?ASWAccessKeyId= AKIAJ56TQJRTWSMTNPEA&Expires=1483635133&Signature= RJnKdI0M2nESh0dHc9Xy7Mpwjml=&response-content-disposition= inline;filename=IISTE International Journals 2013 Decemb.pdf [retrieved on Jan. 5, 2017] table 3.
Yutaka Mori et al: "Flavor Components of Miso: Basic Fraction", Agricultural and Biological Chemistry, vol. 47, No. 7, Jul. 1983 (Jul. 1983), pp. 1487-1492, XP055332698, JP ISSN: 0002-1369, DOI: 10.1080/00021369.1983.10865811 tables II, III.
International Search Report for PCT/IB2016/001309, dated Jan. 17, 2017.
C. Ubeda et al: "Characterization of odour active compounds in strawberry vinegars", Flavour and Fragrance Journal., vol. 27, No. 4, Jul. 24, 2012 (Jul. 24, 2012), pp. 313-321, XP055332147, GB ISSN: 0882-5734, DOI: 10.1002/ffj.3103 p. 319, left-hand column, paragraph 4; table 1.
International Search Report for PCT/IB2016/001305, dated Mar. 17, 2017.
Written Opinion for PCT/IB2016/001305, dated Mar. 17, 2017.
Ulrich Krings et al: "Thin-layer high-vacuum distillation to isolate volatile flavour compounds of cocoa powder", European Food Research and Technology; Zeitschrift Fur Lebensmitteluntersuchung und -Forschung A, Springer, Berlin, DE, vol. 223, No. 5, Feb. 14, 2006 (Feb. 14, 2006), pp. 675-681, XP019420493, ISSN: 1438-2385, DOI: 10.1007/500217-006-0252-X table 1.
International Search Report for PCT/IB2016/001272, dated Jan. 23, 2017.
Written OPinion for PCT/IB2016/001272, dated Jan. 23, 2017.

* cited by examiner

| Molecule | Salt | | | | Sweet | | | | | Bitterness | Umami |
|---|---|---|---|---|---|---|---|---|---|---|---|
| | Salt Solution (0.2-1.0%) | Maggi (10%-100%) | Kikkomen Soy Sauce (10%-100%) | Cheese sauce (100%) | Sucrose Soluton (2-8%) | Sucrolose Solution (150-300 ppm) | Reb-A Solution (150-300 ppm) | Coke Life (100%) | Sprite ZERO (100%) | Dark Chocolate | Maggi (10%-100%) |
| 2-piperidone (delta valerolactam) | Y | Y | Y | Y | Y | Y | Y | Y | Y | Y | Y |
| 2-pyrrolidone (delta butryolactam) | Y | Y | Y | Y | Y | Y | Y | Y | Y | Y | Y |
| 4-hydroxy-2-pyrrolidinone | Y | Y | Y | Y | Y | Y | Y | dnt | dnt | dnt | Y |
| N-methylcaprolactam | Y | Y | Y | dnt | Y | Y | Y | dnt | dnt | dnt | Y |
| epsilon-caprolactam | Y | Y | Y | dnt | Y | Y | Y | Y | dnt | Y | Y |
| 5-methoxy-2-pyrrolidinone | dnt | Y | Y | dnt | Y | Y | Y | dnt | dnt | dnt | Y |

Benchtop Validation of Taste Modulation (applications tested)

dnt = did not test

COMPOSITION COMPRISING TASTE MODULATION COMPOUNDS, THEIR USE AND FOODSTUFF COMPRISING THEM

FIELD OF THE INVENTION

The invention relates to a composition comprising taste modulation compounds, uses of these compositions and foodstuffs comprising them.

BACKGROUND OF THE INVENTION

The flavour industry is continuously seeking ways to enhance, alter or modify the taste of foodstuffs. One way of doing so is the addition of taste modulating compounds which cover a wide spectrum of applications such as improving the perception of sweet, savory, umami, and saltiness; masking bitterness, sourness, astringency and saltiness; and triggering effects such as warming, cooling or the stimulation of saliva.

In US patent application No. 2013/0115356 A1 sclareolide is used to attenuate the liquorice taste associated with stevia while U.S. Pat. No. 4,917,913 recites the use of sclareolide to enhance the organoleptic properties of foodstuffs such as the richness and creaminess of low fat ice cream, sweetness of foodstuffs and beverages which have been sweetened with non-nutritive sweeteners such as aspartame. However, the use of this compound is restricted to such sweeteners.

U.S. Pat. No. 5,683,737 attempts to modulate flavour and taste with glucono-delta lactone, addition of which is required at levels that lead to an accompanying mild acid taste. JP patent application No. 2012-070636A discloses ethyl guaiacol and ethyl furaneol as salt enhancers in soy sauce which can tolerate the smoke and caramel aroma of these compounds which restricts the use of these compounds.

Thus, there is still a need for flavour modifying compounds that do not have the above drawbacks, such as detectable taste or specific application and can be used in a wide variety of foodstuffs and beverages.

BRIEF DESCRIPTION OF DRAWING

FIG. 1—The following flavour modifying compounds have been tested in bench top screening tests: 2-piperidone, 2-pyrrolidone, 4-hydroxy-2-pyrrolidinone, N-methylcaprolactam, epsilon-caprolactam, 5-methoxy-2-pyrrolidinone. The following taste modulations have been tested: salt enhancement, sweet enhancement, bitterness reduction, umami enhancement.

DETAILED DESCRIPTION

The applicant has found that flavour modifying compositions comprising certain flavour modifying compounds can be used in a wide variety of applications for modifying the flavour of foodstuffs and beverages. Thus, the first aspect of the invention relates to a flavour modifying composition comprising one or more flavour modifying compounds according for Formula I

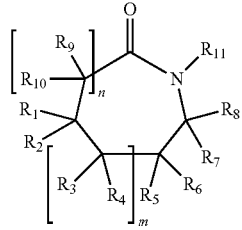

wherein
m and n are independently of each other 0 or 1,
$R_1$, $R_2$, $R_6$ and $R_8$ are independently from each other hydrogen or a linear C1-C3 alkyl group,
$R_3$, $R_4$, $R_9$ and $R_{10}$ represent hydrogen,
$R_5$ and $R_7$ are independently from each other selected from hydrogen or OR', wherein R' represents a hydrogen or a linear C1-C3 alkyl group,
$R_{11}$ represents hydrogen or a linear C1-C3 alkyl group.

The term "flavour modifying composition" as used herein is intended to mean that said composition can modify the sensory experience of edible compositions by enhancing, multiplying, potentiating, decreasing, suppressing, or inducing the taste, smell, texture, and/or flavour profiles of a natural or synthetic tastant, flavouring agent, taste profile, flavour profile, and/or texture profile in an animal or a human edible composition. Mainly, the purpose of such modification is principally to increase the intensity of a desirable attribute, to replace a desirable attribute that is not present or somehow lost in the edible composition, or to decrease the intensity of an undesirable attribute. In particular, it is desirable to increase the intensity in saltiness sensation, sweetness sensation, sourness sensation, kokumi sensation, or umami sensation, or to suppress bitterness sensation. The "flavour modifying composition" can also enhance and/or modify the oral perceptions imparted through chemical sensing of non-fundamental taste properties (which are called "sensate"), including cooling, heat (pain), astringency, metallic, and salivation in the oral cavity. Particularly, the flavour modifying composition can decrease astringency sensation, and/or stimulate salivation (i.e. an increase in mouth moisture).

The term "flavour modifying compounds" as used herein is intended to mean taste modulating compounds and refers to molecules that modify taste and sensate perceptions (and/or sensations). In all cases, the specificity of such compounds is that they do not exhibit perceptible taste and aroma properties (taste-less and aroma-less). Thus, an important distinguishing feature of these "flavour modifying compounds" is that they modulate the flavour perception of a foodstuff, while being imperceptible if consumed alone.

Such flavour modifying compounds can be of synthetic origin or natural origin.

Modification of flavour includes the increase in saltiness sensation, increase in sweetness sensation, improvement of sugar-like qualities of high intensity sweeteners, reduction of bitterness and astringency, stimulation of salivation or increase in umami sensation.

According to one embodiment of the invention, the flavour modifying composition comprises one or more flavour modifying compounds according to Formula I, wherein n is 1, m is 0; $R_1$, $R_2$, $R_5$, $R_6$, $R_7$, $R_8$, $R_9$, $R_{10}$ and $R_{11}$ are hydrogen.

According to one embodiment of the invention, the flavour modifying composition comprises one or more flavour modifying compounds according to Formula I, wherein n is 0, m is 0; $R_1$, $R_2$, $R_5$, $R_6$, $R_7$, $R_8$ and $R_{11}$ are hydrogen.

According to one embodiment of the invention the flavour modifying compound is selected from the group consisting of 2-piperidone, 2-pyrrolidone, 4-hydroxy-2-pyrrolidinone, N-methylcaprolactam, epsilon-caprolactam, 5-methoxy-2-pyrrolidinone or mixtures thereof.

The flavour modifying composition is added to the foodstuffs or beverages in such an amount that the flavour modifying compound is present in the foodstuffs or beverages in an amount of 0.1 to 200 ppm, preferably in an amount of 1 to 100 ppm, more preferably in an amount of 3 to 50 ppm and even more preferably in an amount of 5 to 20 ppm.

The terms "foodstuff", "edible compositions" and "food product" as used herein refer to an ingestible product, such as, but not limited to, human food, animal (pet) foods, and pharmaceutical compositions. Examples of foodstuffs may include, but are not limited to, snacks, confections, plant materials and meals which may or may not provide essential nutrients. Plant materials include cacao, cacao beans, coffee, coffee beans and tea leaves or powder. Non-limiting examples of foodstuffs include salad dressings, sauces, gravies, marinades, rubs, nutritional bars, baked goods, breads, caramel, cooked grains, meat products, poultry products, meat, poultry, fowl, fish, sea protein sources, beans, pasta, confectionery products, savoury snacks, dairy products, cheeses, yogurt, butter, margarine, ready to eat cereals, condiments and gravies. Non-limiting examples of animal foods may include: pet food, dog food, cat food, ferret food, pocket pet food, rodent food, livestock feed, cattle feed, goat feed, pig feed, sheep feed, horse feed and the like. Pet foods such as foods for dogs and cats may be formulated according to the "Fédération europénne de l'industrie des aliments pour animaux familiers (FEDIAF)" or the "American Association of Feed Control Officials (AAFCO)" guidelines. These guidelines assure that pet foods are complete and balanced to meet all nutrient requirements of dogs and cats. Other embodiments of pet foods could include treats made for dogs and cats. These embodiments may not meet complete and balanced nutrient requirements as specified by FEDIAF and AAFCO.

The term "beverage" as used herein means a product that may be consumed orally by a human or animal and which provides water or other nutrients necessary to sustain health of the human or animal. In particular, the term "beverage" includes mixes and concentrates, including but not limited to, alcoholic and non-alcoholic ready to drink and dry powdered beverages. Non-limiting examples of beverages include soda, carbonated drinks, brewed beverages, dairy, drinkable yogurt, milk, coffee whiteners, nutritional drinks, nutritional beverages, soft carbonated beverages, soft non-carbonated fruit flavoured beverages, fountain beverages, frozen ready-to-drink beverages, soft non-carbonated beverages, juices, water, flavoured water, flavoured beverages, carbonated water, syrup, diet beverages, carbonated soft drinks, powdered soft drinks, as well as liquid concentrates (including liquid, frozen, and shelf stable), fountain syrups, cordials, fruit juices, fruit containing beverages, fruit flavoured beverages, vegetable juices, vegetable containing beverages, isotonic beverages, non-isotonic beverages, soft drinks containing a fruit juice, coffee and coffee-based drinks, coffee substitutes, cereal-based beverages, teas, teas including dry mix products as well as ready-to-drink teas (herbal and tea-leaf based), dairy products, soy products, fruit and vegetable juices and juice flavoured beverages as well as juice drinks, juice cocktails, nectars, concentrates, punches, other beverages processed with heating (infusions, pasteurization, ultra high temperature, ohmic heating or commercial aseptic sterilization) and hot-filled packaging, cold-filled products made through filtration, chemical preservation, and other preservation techniques. Particular embodiments of the carbonated beverages may include coke, diet coke, lemon-lime, orange, orange juice, heavy citrus, fruit flavoured, cream sodas, tea or tea-flavoured drinks, and root beer, for example. Particular embodiments of milk can be any suitable form including fat free milk, low fat milk, reduced fat milk, whole milk, powdered milk or a combination thereof.

In a further embodiment of the invention, the flavour modifying composition further comprises a solvent. The solvent not only allows for an exact dosage of the flavour modifying compound to the foodstuffs and beverages but also facilitates an even distribution of the flavour modifying compound in the foodstuffs and beverages.

Suitable solvents may be hydrophilic solvents such as water, propylene glycol, glycerol, ethanol and triacetin or hydrophobic solvents such as vegetable oils, for example palm oil, soybean oil, rapeseed oil, sunflower seed oil, peanut oil, coconut oil, olive oil or medium chain triglycerides (MCT). Medium chain triglycerides are triglycerides based on aliphatic fatty acids comprising 6 to 12 carbon atoms.

In a further embodiment of the invention, the flavour modifying composition further comprises a flavouring ingredient.

The terms "flavouring ingredient" and "flavouring" are intended to be understood as a compound that is recognized by a person skilled in the art as being able to impart or modify in a positive or pleasant manner the taste of a composition, and not simply as a compound having a taste. Such a flavour ingredient can be a natural substance, a nature-identical substance or an artificial substance. In general terms, these flavouring ingredients belong to chemical classes as varied as alcohols, aldehydes, ketones, esters, ethers, acetates, nitriles, terpenoids, nitrogenous or sulphurous heterocyclic compounds and essential oils. Many of these co-ingredients are in any case listed in reference texts such as the book by S. Arctander, Perfume and Flavour Chemicals, 1969, Montclair, N.J., USA, or its more recent versions, or in other works of a similar nature, as well as in the abundant patent literature in the field of flavour.

The compounds of the present invention can easily be used to replace totally or partially the sugars or sugars substitutes used as sweeteners when used in a foodstuff. By "sugars" or "sugars substitutes" as sweeteners it is meant any monosaccharide such as glucose, fructose, galactose, mannose or glucose, disaccharides such as lactose, sucrose or maltose, polysaccharides such as starch, oligosaccharide, sugar alcohols, corn syrup, high fructose corn syrup, "sugar alcohol" sweeteners such as erythritol, isomalt, lactitol, mannitol, sorbitol, xylitol, maltitol, maltodextrin, and the like, or other carbohydrate forms such as gums that are starch based, vegetable based or seaweed based (beta glucan, psyllium). Additional sweeteners could include commonly used high intensity sweeteners such as aspartame, saccharin, acesulfame-K, sucralose, alitame, hydrogenated starch hydrolyzate (HSH), stevioside, rebaudioside A, rebaudioside B, rebaudioside C, rebaudioside D, rebaudioside F, rebaudioside G, rebaudioside H and other sweet Stevia-based glycosides, abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavonol, dulcoside, gaudichaudioside, glycyrrhizin, glycyrrhetinic acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rubusosides, saccharin and its salts and derivatives, scandenoside, selligueanin A, siamenosides, in particular siamenoside I, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, thaumatin, in particular thaumatin I and II, trans-anethol, trans-cinnamaldehyde, trilobatin and D-tryptophane, carrelame and other guanidine-based sweeteners, etc. Sweeteners also include cyclamic acid, mogroside, tagatose, neotame and other aspartame derivatives, D-tryptophan, glycine, isomalt, and hydrogenated glucose syrup (HGS). The term "sweeteners" also includes combinations of sweeteners as disclosed herein.

In a further embodiment of the invention, the flavour modifying composition further comprises one or more additional flavour modifying compounds, different to the one or more flavour modifying compounds of the invention.

In a preferred embodiment of the invention, the flavour modifying composition further comprises at least one compound selected from the group consisting of dihydro-3-hydroxy-4,4-dimethyl-2(3H)-furanone (pantolactone), 2-acetyl-butyrolactone, 4,6-dimethyl-alpha-pyrone, 4-hydroxy-6-methyl-2-pyrone, 3,4-dihydro-6-methyl-2H-pyran-2-one, dihydroactinidiolide, 2-acetyl-2-methyl-gamma-butyrolactone, dihydro-5-(hydroxymethyl)-2(3H)-furanone, 3-hydroxy-2-pyrone, D-arabino-1,4-lactone, 9-decen-2-one, 5,6-dihydro-4-hydroxy-6-methyl-2H-pyran-2-one, 3-methyl-2(5H)-furanone, 5-methoxy-2-pyrrolidinone, hydroxyl-gamma-dodecalactone, massoia lactone or mixtures thereof. Without being bound by any theory, it is hypothesized that a synergistic effect occurs between the flavour modifying compound(s) of the present invention and the compound(s) selected from the above-mentioned group.

The second aspect of the invention is a product selected from the group of foodstuffs and beverages comprising the flavour modifying composition. In a further embodiment the product comprises the flavour modifying compound of the flavour modifying composition in an amount of 0.1 to 200 ppm, preferably in an amount of 1 to 100 ppm, more preferably in an amount of 3 to 50 ppm and even more preferably in an amount of 5 to 20 ppm.

The third aspect of the invention is the use of the flavour modifying composition for modifying the perception of sweetness, saltiness, umami, astringency, salivation and bitterness in foodstuffs and beverages.

The fourth aspect of the invention is a method of improving the perception of sweetness, saltiness, umami, astringency, salivation and bitterness in foodstuffs or beverages comprising
providing a foodstuff or beverage and
adding a flavor modifying composition comprising one or more flavor modifying compounds according for Formula I

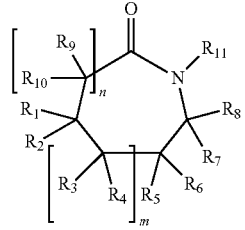

Formula I wherein
m and n are independently of each other 0 or 1,
$R_1$, $R_2$, $R_6$ and $R_8$ are independently from each other hydrogen or a linear C1-C3 alkyl group,
$R_3$, $R_4$, $R_9$ and $R_{10}$ represent hydrogen,
$R_5$ and $R_7$ are independently from each other selected from hydrogen, OR', wherein R' represents a hydrogen or a linear C1-C3 alkyl group,
$R_{11}$ represents hydrogen or a linear C1-C3 alkyl group.

In a first embodiment, the present invention is a method for enhancing saltiness in foodstuffs or beverages.

In a second embodiment, the present invention provides a method for enhancing sweetness and/or improving the sugar-like taste perception of high intensity sweeteners in foodstuffs or beverages.

In a third embodiment, the present invention provides a method for enhancing umami in foodstuffs or beverages.

In a fourth embodiment, the present invention provides a method for reducing astringency in foodstuffs or beverages.

In a fifth embodiment, the present invention provides a method for increasing salivation in foodstuffs or beverages.

In a further embodiment, the present invention provides a method for reducing bitterness in foodstuffs or beverages.

EXAMPLES

Example 1—Various Lactams Added to Cheese Sauce

Epsilon-caprolactam, 2-piperidone, and N-methylcaprolactam were added to cheese sauce.

All cheese sauce samples were served at 21° C. Samples were stirred by hand prior to portioning to ensure even distribution of components. Approximately 9 ml of cheese sauce was served into odorless, translucent, one-ounce cups labeled with three-digit codes and capped with a lid. The samples were portioned out approximately 45 minutes prior to evaluation.

Panelists evaluated all samples in fully enclosed partitioned booths under white lights. Fizz NETWORK Software Acquisitions Biosystemes 2.47B was used for data collection. Each panelist was provided with filtered water for rinsing and instructed to follow a strict rinsing procedure. The rinsing protocol required panelists to rinse prior to tasting the first sample, and after tasting each sample.

Samples were evaluated using a Deviation from Reference (DFR) method. Panelists were given an identified reference labeled "000" and a coded sample simultaneously. The coded sample was either a blind, coded reference or a coded test sample. The panelists were instructed to taste the reference (000) first and mentally evaluate its SALTINESS intensity. Panelists were then instructed to taste and rate the coded sample's intensity for SALTINESS compared to the identified reference. Sample sets were given to the panelists in balanced, randomized order. A one-minute wait period was enforced between sample sets to reduce flavour carry-over.

Panelists rated SALTINESS intensity difference from the reference using a 9-pt scale anchored with the following descriptors: (−4) Extremely less than Reference, (0) Same as Reference, (4) Extremely more than Reference. Number values were NOT shown on the scale. Statistical mean differences were calculated using one-way ANOVA using Fizz Calculations Biosystemes 2.47B. A significance level of $p \leq 0.05$ was set for statistical tests. Compared to the control the perceptions of saltiness and creaminess in the cheese sauce comprising epsilon-caprolactam, 2-piperidone, and N-methylcaprolactam is increased.

TABLE 1

Various Lactams Added to Cheese Sauce

| Product | Test Effects | | | |
|---|---|---|---|---|
| | Taster 1 | Taster 2 | Taster 3 | Taster 4 |
| Cheese sauce alone (Control) | Adequate cheese Salty Cream | Weak cheese Salty Cream | Cheese Salty Cream | Cheese Salty |
| Cheese sauce plus 5 ppm epsilon-caprolactam | Increased saltiness Slightly bitter | Sweeter with less linger | Sweeter upfront Cleaner Less lingering | Sweeter upfront Cleaner Less lingering |
| Cheese sauce plus 5 ppm 2-piperidone | Delayed saltier More dairy impact | Increased saltiness Increased creaminess | Saltier Creamier | Clean sweet Stronger sweet |
| Cheese sauce plus 5 ppm N-methylcaprolactam | Slight increase in saltiness | Unclean Slightly bitter | Bitter Increased saltiness | Least effective of three |

Example 2—Effect of Epsilon-Caprolactam and 2-Piperidone on High Intensity Sweeteners In this example, either epsilon-caprolactam or 2-piperidone were added at each 5 ppm to water containing Rebaudioside-A (Reb-A) at either 25 or 250 ppm to demonstrate the impact on sweetness of the solution.

The taste perception of the products containing the high intensity sweeteners without epsilon-caprolactam or 2-piperidone (Control) is compared with the same product (Test) containing epsilon-caprolactam or 2-piperidone. Four expert tasters assessed a purified and amplified perception of sweetness for the products comprising epsilon-caprolactam or 2-piperidone. When a tasting solution is dosed with Rebaudioside-A at 25 ppm, and 5 ppm of 2-piperidone is added, sweetness is purified and amplified as indicated by the removal of interference and "noise" from sweetness of Rebaudioside-A at "just perceivable" tasting solution concentrations. When a tasting solution is dosed with Rebaudioside-A at 250 ppm, with either epsilon-caprolactam or 2-piperidone at each 5 ppm, "bitter interference" and brightens pure sweetness are reduced.

TABLE 2

Epsilon-caprolactam and 2-piperidone impact on sweetness perception of Reb-A at 25 and 250 ppm

| | Dosage of Reb-A, ppm | TMC Level, ppm | Taster Observations | | | |
|---|---|---|---|---|---|---|
| | | | Taster 1 | Taster 2 | Taster 3 | Taster 4 |
| Reb-A* (Control) | 250 | 0 | sweet, metallic, bitter, lingering | sweet, lingering | sweet, metallic, bitter, lingering | sweet, lingering |
| Reb-A plus epsilon-caprolactam | 250 | 5 | sweeter, less lingering, slightly bitter | sweeter with less linger | sweeter upfront, cleaner, less lingering | sweeter upfront, cleaner, less lingering |
| Reb-A plus 2-piperidone | 250 | 5 | clean sweet, much purer than control | clean sweet, no lingering | clean sweet, no bitter, sweet does not linger | clean sweet, stronger sweet |

TABLE 2-continued

Epsilon-caprolactam and 2-piperidone impact on sweetness perception of Reb-A at 25 and 250 ppm

|  | Dosage of Reb-A, ppm | TMC Level, ppm | Taster Observations | | | |
|---|---|---|---|---|---|---|
|  |  |  | Taster 1 | Taster 2 | Taster 3 | Taster 4 |
| Reb-A (Control) | 25 | 0 | low sweet | low sweet | low sweet | low sweet |
| Reb-A plus epsilon-caprolactam | 25 | 5 | sweet, slightly bitter | dirty, unclean | sweeter than control, off-taste | slightly higher sweet |
| Reb-A plus 2-piperidone | 25 | 5 | sweeter, clean | clean sweet, no bitter | sweeter than control, no bitter | best - sweetest, clean |

*PureCircle Rebaudioside-A 97%

Example 3—Bench Top Screening Tests

The following flavour modifying compounds have been tested (alone) in bench top screening tests: 2-piperidone, 2-pyrrolidone, 4-hydroxy-2-pyrrolidinone, N-methylcaprolactam, epsilon-caprolactam, 5-methoxy-2-pyrrolidinone. The following taste modulations have been tested: salt enhancement, sweet enhancement, bitterness reduction, umami enhancement.

Salt—Model Salt Solution—[Ranged from 0.2%-1.2% Salt]

Sodium chloride (NaCl) solutions were used as a source of a liquid salt model. NaCl solutions were evaluated without and with a water based solution of flavour modifying compound, typically at 5 ppm concentration, although tests were also run at 1, 10 and 20 ppm at times. Up to five expert tasters consumed 1 g of NaCl solution alone (control), followed by 1 g of NaCl solution dosed with 1, 5, 10 or 20 ppm flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Salt—Maggi® (Off-Shelf, Product Produced by Nestle) [Ranged from 10% Diluted to Full Strength]

Maggi® Seasoning (manufactured by Nestle USA, Inc., Glendale, Calif.) was used as a source of liquid savory seasoning. Maggi® seasoning liquid was evaluated without and with a water based solution of flavour modifying compound, typically at 5 ppm concentration, although tests were also run at 1, 10 and 20 ppm at times. Up to five expert tasters consumed 1 g of Maggi® alone (control), followed by 1 g of Maggi® dosed with 1, 5, 10 or 20 ppm of flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Salt—Kikkomen Soy Sauce (Full and Low Sodium) [Ranged from 10% Diluted to Full Strength]

Regular and/or low sodium soy sauce (Kikkoman's®) was evaluated without and with a water based solution of flavor modifying compound, typically at 5 ppm concentration, although tests were also run at 1, 10 and 20 ppm at times. Up to five expert tasters consumed 1 g of soy sauce alone (control), followed by 1 g of soy sauce dosed with 1, 5, 10 or 20 ppm flavor modifying compound. Comparison of saltiness intensity was noted and salty taste modulation by the flavor modifying compound was recorded. At each concentration, (1, 5, 10 and 20 ppm of flavor modifying compound) an increase in saltiness sensation is recorded.

Salt—Cheese Sauce

Cheese sauce was purchased at a local grocery store. All cheese sauce samples were served at room temperature (~70° F.). Samples were stirred by hand prior to portioning to ensure even distribution of components. Approximately one ounce of cheese sauce was served into odorless, translucent, one-ounce cups. Up to five expert tasters consumed 5-10 g of cheese sauce alone (control), followed by 5-10 g of cheese sauce dosed with 1, 5, 10 or 20 ppm of flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Sweet—Model Sucrose Solution [Ranged from 1.0%-12.0% Sucrose]

Filtered water (Brita® Basic Faucet Filtration System) was used for all dilutions. Sucrose solutions were made up as a source of a liquid sweet model. Sucrose solutions were evaluated without and with a water based solution of flavour modifying compound, typically at 5 ppm concentration, although tests were also run at 1, 10 and 20 ppm at times. Up to five expert tasters consumed 10-20 g of sucrose solution alone (control), followed by 10-20 g of sucrose solution dosed with 1, 5, 10 or 20 ppm flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Sucralose Solution [Ranged from 100 ppm-450 ppm Sucralose]

Filtered water (Brita® Basic Faucet Filtration System) was used for all dilutions. Sucralose solutions were made up as a source of a liquid sweet model. Sucralose solutions were evaluated without and with a water based solution of flavour modifying compound, typically at 5 ppm concentration, although tests were also run at 1, 10 and 20 ppm at times. Up to five expert tasters consumed 10-20 g of sucralose solution alone (control), followed by 10-20 g of sucralose solution dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Reb-A Solution [Ranged from 100 ppm 450 ppm Reb-A]

Filtered water (Brita® Basic Faucet Filtration System) was used for all dilutions. Reb-A solutions were made up as a source of a liquid sweet model. Reb A solutions were evaluated without and with a water based solution of flavor modifying compound, typically at 5 ppm concentration, although tests were also run at 1, 10 and 20 ppm at times. Up to five expert tasters consumed 10-20 g of Reb-A solution alone (control), followed by 10-20 g of Reb-A solution dosed with 1, 5, 10 or 20 ppm of flavor modifying compound. Comparison of sweetness intensity was noted and sweet taste modulation by the flavor modifying compound was recorded. At each concentration, (1, 5, 10 and 20 ppm of flavor modifying compound) an increase in sweetness sensation is recorded.

Sweet—Coke Life®—Off Shelf (a Product of Coca Cola Corp.)

Coke Life® (Coca Cola Corp.) was evaluated without and with a water based solution of flavour modifying compound, typically at 5 ppm concentration, although tests were also run at 1, 10 and 20 ppm at times. Up to five expert tasters consumed 20-30 g of Coke Life® alone (control), followed by 20-30 g of Coke Life® dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Sprite ZERO®—Off Shelf, (a Product of Coca Cola Corp.)

Sprite ZERO® (Coca Cola Corp.) was evaluated without and with a water based solution of flavour modifying compound, typically at 5 ppm concentration, although tests were also run at 1, 10 and 20 ppm at times. Up to five expert tasters consumed 20-30 g of Sprite ZERO® alone (control), followed by 20-30 g of Sprite ZERO® dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Bitter—Dark Chocolate

Dark chocolate (Lindt® 85% cocoa) was melted, and used as a base for samples without (control) or with flavour modifying compound added at 5 ppm (test) concentration, although tests were also run at 1, 10 and 20 ppm at times. Up to five expert tasters consumed 10-20 g of chocolate alone (control), followed by 10-20 g of chocolate dosed with 1, 5, 10 or 20 ppm of flavour modifying compound. Comparison of bitterness, sweetness and salivation intensity was noted and taste modulation by the flavour modifying compound was recorded. At each concentration, (1, 5, 10 and 20 ppm of flavour modifying compound) a decrease in bitterness sensation is recorded. Additionally, an increase in sweetness and salivation is recorded.

Umami—Maggi® (Off-Shelf, Product Produced by Nestle) [Ranged from 10% Diluted to Full Strength]

Maggi® Seasoning (manufactured by Nestle USA, Inc., Glendale, Calif.) was used as a source of liquid savory seasoning. Maggi® seasoning liquid was evaluated without and with a water based solution of flavour modifying compounds, typically at 5 ppm concentration, although tests were also run at 1, 10 and 20 ppm at times. Up to five expert tasters consumed 1 g of Maggi® alone (control), followed by 1 g of Maggi® dosed with 1, 5, 10 or 20 ppm of flavour modifying compound. Comparison of saltiness intensity was noted and umami taste modulation by the flavour modifying compound was recorded. At each concentration, (1, 5, 10 and 20 ppm of flavour modifying compound) an increase in umami and saltiness sensations is recorded.

The invention claimed is:

1. A foodstuff or beverage comprising a flavor modifying composition comprising a taste modulating compound having the formula:

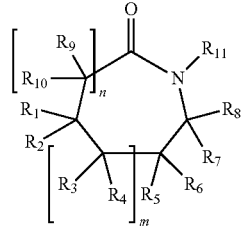

Formula I wherein
m and n are independently 0 or 1,
$R_1$, $R_2$, $R_6$ and $R_8$ are independently hydrogen or a linear C1-C3 alkyl group,
$R_3$, $R_4$, $R_9$ and $R_{10}$ are hydrogen,
$R_5$ and $R_7$ are independently hydrogen or OR', wherein R' is hydrogen or a linear C1-C3 alkyl group,
$R_{11}$ is hydrogen or a linear C1-C3 alkyl group,
wherein the taste modulating compound is in an amount of from 0.1 to 200 ppm of the foodstuff or beverage;
wherein the taste modulating compound is not epsilon-caprolactam; and
wherein the taste modulating compound does not exhibit perceptible taste and aroma properties.

2. The foodstuff or beverage according to claim 1, wherein the taste modulating compound is in an amount of 5 to 20 ppm of the foodstuff or beverage.

3. A method for modifying the perception of a tast selected from the group consisting of sweetness, saltiness, umami, astringency, salivation and bitterness in a foodstuff or a beverage, comprising:
providing a foodstuff or beverage; and
adding the taste modulating compound according to claim 1 to the foodstuff or beverage in order to modify the perception of said taste in the foodstuff or beverage.

4. A method of improving the perception of a tast selected from the group consisting of sweetness, saltiness, umami, astringency, salivation and bitterness in a foodstuff or beverage comprising:
providing a foodstuff or beverage and
adding the taste modulating compound according to claim 1 to the foodstuff or beverage in order to improve the perception of said taste in the foodstuff or beverage.

5. The foodstuff or beverage according to claim 1 wherein the taste modulating compound is selected from the group consisting of 2-piperidone, 2-pyrrolidone, 4-hydroxy-2-pyrrolidinone, N-methylcaprolactam, 5-methoxy-2-pyrrolidinone, and mixtures thereof.

6. The foodstuff or beverage according to claim 5, wherein the taste modulating compound is in an amount of from 1.0 to 100 ppm of said foodstuff or beverage.

7. The foodstuff or beverage according to claim 1, wherein the flavor modifying composition further comprises a solvent.

8. The foodstuff or beverage according to claim 1, wherein the flavor modifying composition further comprises a flavoring ingredient.

9. The foodstuff or beverage according to claim 1, wherein the flavor modifying composition further comprises an additional taste modulating compound that is different than the taste modulating compound having the formula:

Formula I

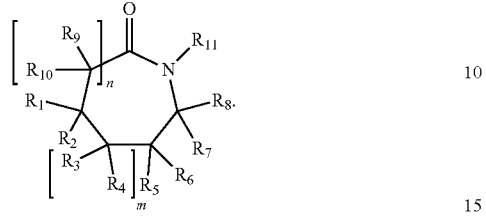

10. The product according to claim 1, wherein the flavor modifying composition further comprises at least one compound selected from the group consisting of dihydro-3-hydroxy-4,4-dimethyl-2(3H)-furanone (pantolactone), 2-acetyl-butyrolactone, 4,6-dimethyl-alpha-pyrone, 4-hydroxy-6-methyl-2-pyrone, 3,4-dihydro-6-methyl-2H-pyran-2-one, dihydroactinidiolide, 2-acetyl-2-methyl-gamma-butyrolactone, dihydro-5-(hydroxymethyl)-2(3H)-furanone, 3-hydroxy-2-pyrone, D-arabino-1,4-lactone, 9-decen-2-one, 5,6-dihydro-4-hydroxy-6-methyl-2H-pyran-2-one, 3-methyl-2(5H)-furanone, 5-methoxy-2-pyrrolidinone, hydroxyl-gamma-dodecalactone, massoia lactone, and mixtures thereof.

* * * * *